(No Model.)

E. BURNETT.
TRUCK.

No. 281,612. Patented July 17, 1883.

WITNESSES
J. Henry Taylor
N. H. Kenyon

INVENTOR
Edward Burnett
by Alex. P. Browne
Attorney

UNITED STATES PATENT OFFICE.

EDWARD BURNETT, OF SOUTHBOROUGH, ASSIGNOR TO HIMSELF, AND ALEX. P. BROWNE, OF BOSTON, MASSACHUSETTS.

TRUCK.

SPECIFICATION forming part of Letters Patent No. 281,612, dated July 17, 1883.

Application filed May 7, 1883. (No model.)

*To all whom it may concern:*

Be it known that I, EDWARD BURNETT, of Southborough, in the State of Massachusetts, have invented a new and useful truck or carriage for the transportation and sale of milk and similar liquid commodities, of which the following is a specification.

In the transportation and sale of liquid commodities, particularly milk, it is found to be convenient and economical to make use of a vessel of large size in which the milk may be transported, and from which it may be sold. Among other advantages are these—viz., that the time, labor, and risk of loss in transferring the milk to smaller vessels are saved, and the milk, being in a large body, is less susceptible to injurious effects from exposure to unfavorable temperature. On the other hand, a vessel of sufficient size to give these advantages is commonly too large to be conveniently handled and transported, except in a suitable vehicle or carriage, and to provide such is the object of my invention.

Figure 1:
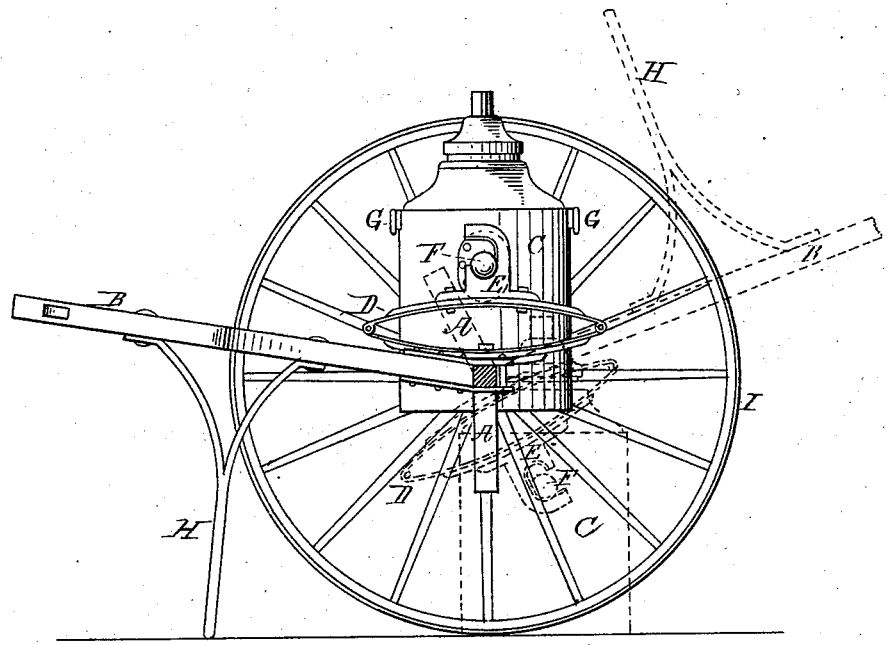
Figure 2:
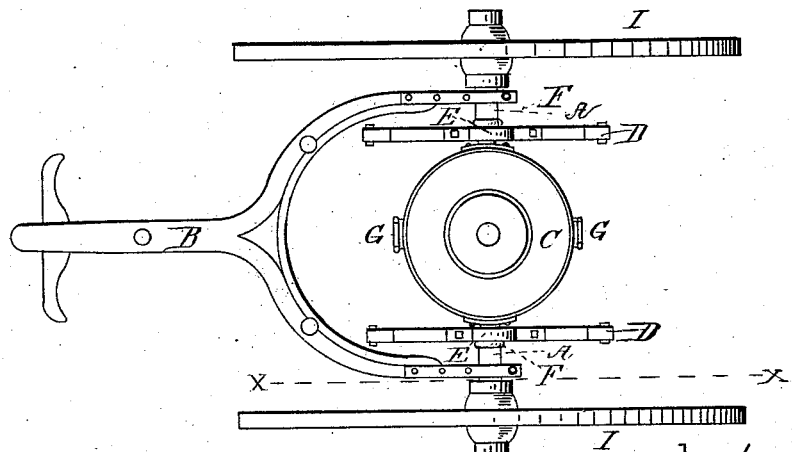

My improved carriage, in the best form known to me, is represented in the accompanying drawings, in elevation in Figure 1, and in plan in Fig. 2. It consists of a two-wheeled truck having a bent axle, A, and a suitable draft attachment or pole, B. The bend in the axle is made of sufficient size to admit the can or vessel C to be carried, and the height of the truck or the diameter of the wheels I is made sufficient to give a good clearance of the axle from the ground when the truck is being drawn.

Upon the axle A are springs D, one on either side, and upon these springs are fingers E, which perform the double function of lifting the can from the ground and supporting it in transportation, the springs interposed between the point of support and the axle of the truck serving to take up or cushion the jar occurring in transportation, and thus diminishing the extent to which the liquid in the can is liable to be stirred or churned up.

The can or vessel with which the truck is to be used is to be provided with trunnions F, or equivalent projections, with which the fingers E can engage. These trunnions are put upon the sides of the can at a sufficient height to be above the center of gravity of it and its contents, so that the can will remain upright.

I will now describe the operation of the structure. When it is desired to handle and transport the can, the truck is brought up to it in the position shown in Fig. 1 by dotted lines, or so that the fingers E engage with the trunnions F on the can as it stands. The truck is then turned back to its normal position, and in so doing is made to act as a lever of the first order to lift the truck, the hubs of the wheels I being the fulcrum, the can the weight, and pole, axle, springs, and fingers making up the lever. The truck and can are now in position for transportation. The truck may now be locked against swing in the fingers E and the milk taken out as required, or the swing of the can on its trunnions in the fingers may be retained and the can thus be inverted and its contents poured out as required. When so used the handles G, commonly provided on large cans, will afford a convenient grasp to invert the can, care having been taken to locate the trunnion, as shown, with reference to the handles.

For further convenience in the management and use of the truck I prefer to provide the draft or pole with a standard or rest, H, of such length that when it rests upon the ground the weight of the can and contents is divided between this standard and the wheels, so that the truck and can may be safely left standing, if desired. This standard H may be hinged to the pole, if desired, so as to be folded up out of the way when the truck is being moved along.

It is obvious that so far as the lever action is concerned some other arm might be used to take the place of the draft-pole in this respect; but the draft-pole constructed and arranged as shown forms a simple and convenient attachment for the lifting as well as the transporting operation.

I claim—

1. The combination of the wheels I, bent axle A, springs D, and fingers E, in the manner and for the purposes herein set forth.

2. The combination of the wheels I, bent axle A, draft B, springs D, and fingers E, all substantially as herein described, and for the purposes set forth.

3. The combination of the wheels I, bent axle A, draft B, springs D, fingers E, trunnions F, and can C, all substantially as herein shown and described.

EDWARD BURNETT.

Witnesses:
ALEX. P. BROWNE,
J. HENRY TAYLOR.